United States Patent
Sexl et al.

(10) Patent No.: US 10,445,627 B1
(45) Date of Patent: Oct. 15, 2019

(54) PORTABLE DUAL-INTERFACE DATA CARRIER WITH METAL FRAME

(71) Applicant: GIESECKE+DEVRIENT MOBILE SECURITY GMBH, Munich (DE)

(72) Inventors: Markus Sexl, Baierbrunn (DE); Thomas Tarantino, Laufen (DE); Eric Virostek, Silver Lake, OH (US)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 16/153,255

(22) Filed: Oct. 5, 2018

Related U.S. Application Data

(62) Division of application No. 15/948,030, filed on Apr. 9, 2018.

(51) Int. Cl.
  *G06K 19/00* (2006.01)
  *G06K 19/02* (2006.01)
  *G06K 19/077* (2006.01)

(52) U.S. Cl.
  CPC ..... *G06K 19/022* (2013.01); *G06K 19/07722* (2013.01); *G06K 19/07783* (2013.01); *G06K 19/07728* (2013.01)

(58) Field of Classification Search
  USPC .......................... 235/435, 439, 454, 487, 492
  See application file for complete search history.

(56) References Cited

U.S. PATENT DOCUMENTS

2015/0235122 A1* 8/2015 Finn ................. G06K 19/07794
235/439

FOREIGN PATENT DOCUMENTS

| DE | 102010005809 A1 | 7/2011 |
| WO | 9323826 A1 | 11/1993 |

* cited by examiner

*Primary Examiner* — Matthew Mikels
(74) *Attorney, Agent, or Firm* — Workman Nydegger

(57) ABSTRACT

A portable dual-interface data carrier contains a metal sheet which can be provided with low technical effort and especially no ferrite material is required. The resulting portable dual-interface data carrier is more heavy than a state of the art PVC smart card and provides contact based interface on one side, whereas contactless interfaces is working from both sides of the card. One application domain of the data carrier is to provide a so-called smartcard. The present invention is furthermore directed towards a dual-interface module as well as towards a method for providing a portable dual-interface data carrier. Moreover, a data carrier is suggested comprising instructions for performing the suggested method and for manufacturing the portable dual-interface data carrier.

20 Claims, 2 Drawing Sheets

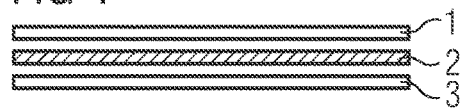
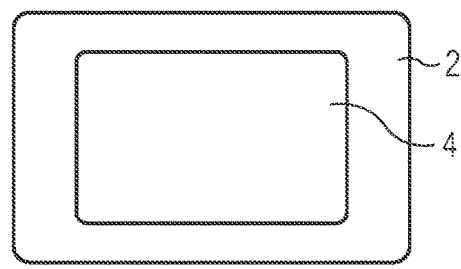
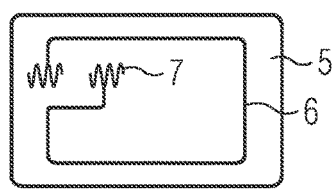
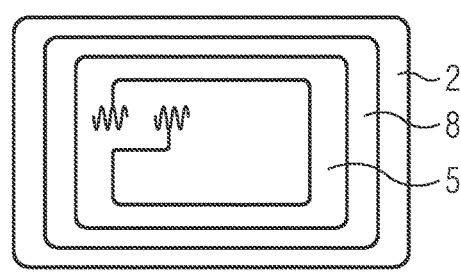
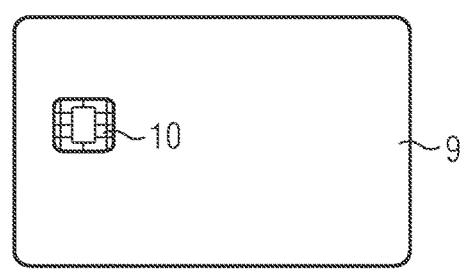

PORTABLE DUAL-INTERFACE DATA CARRIER WITH METAL FRAME

BACKGROUND

The present invention is directed towards a portable dual-interface data carrier, containing a metal sheet, which can be provided with low technical effort and especially no ferrite material is required. The resulting portable dual-interface data carrier is heavier than a state of the art PVC smart card and provides contact based interface on one side, whereas contactless interface is working from both sides of the card. One application domain of the data carrier is to provide a so-called smartcard. The present invention is furthermore directed towards a dual-interface module as well as towards a method for providing a portable dual-interface data carrier. Moreover, a data carrier is suggested comprising instructions for performing the suggested method and for manufacturing the portable dual-interface data carrier.

DE 10 2010 005 809 A1 shows a portable data carrier comprising a contactless interface made of an antenna coil. In this context metal layers are discussed.

WO 1993/023 826 A1 teaches a portable data carrier in the form of a smartcard. This publication also discusses metal layers and implied effects.

It is commonly known to provide a so-called dual-interface data carrier for payment and authentication application scenarios in the form of a smartcard. A smartcard is a typically PVC-based credit card comprising further processing components for performing control instructions and memories. Moreover, typical smartcards provide a dual-interface for contactless and contact-based communication.

Several manufacturing methods are commonly known, which perform lamination of respective layers towards a card body. However, a problem of known data carriers is that in case metal layers are involved, a specific interference may occur in combination with the antenna as discussed in the art.

To overcome such a problem, the known art suggests providing a slit in a metal layer in the position of a module such that the metal layer is discontinuous through and communication from both sides can occur. The slit commonly known in the art is very small and needs to be only of a size small enough to allow data communication. However, there is a disadvantage that the metal layer as such becomes instable and accordingly, the card body may break upon forces for instance in daily usage. Furthermore, such an arrangement requires a specific dual-interface module being cost-intense and which can be provided only at high technical effort.

A further solution known in the art considering interferences is that on the back of the metal layer a ferrite layer is provided for avoidance of such interferences. However, there is a disadvantage that such a ferrite layer allows the card to communicate wirelessly only over one side of the card. The other side of the card is not communicating with the RF field by shielding caused by the metal layer.

This results in further problems, namely that the ferrite layer is cost-intense and as the communication of the antenna is restricted to one side of the card, the user may find such a card inconvenient.

SUMMARY

Accordingly, it is an object of the present invention to provide a portable data carrier with a dual-interface module which can communicate wirelessly over both sides of the card and which can be provided with low technical effort. Moreover, it is an object of the present invention to provide such a module along with a method for manufacturing the data carrier. It is furthermore an object of the present invention to suggest a computer program product comprising instructions to perform the suggested method.

The object is solved by means of independent claims. Further advantages are provided by dependent claims.

Hence, a portable dual-interface data carrier is suggested comprising a metal layer being arranged between at least two plastic layers to form at least a part of a body of the data carrier, wherein the metal layer comprises a recess at least of a size of a carrier foil holding an antenna and the carrier foil is attached to a plastic layer at a position of the recess and the carrier foil holding the antenna is inserted into the recess.

The person skilled in the art will recognize that the above-suggested data carrier may comprise further components, especially such components being typical in the art. Such components involve further units for data processing and optionally security features.

The portable dual-interface data carrier according to the present invention may be provided in the form of a smartcard. A smartcard has typical dimensions being described in several standards such as ANSI/ISO standards. Moreover, the portable dual-interface data carrier holds a communication module providing contactless and contact-based communication. Such communication may be performed by means of a data reader in which the card is inserted and a physical contact is established. Moreover, the antenna being provided in the data carrier may be activated and small currents are induced such that the electronic components of the data carrier can be operated.

The suggested portable dual-interface data carrier is mainly produced using a metal layer and at least two plastic layers, the plastic layers being for instance provided using PVC. The specific data carrier can be produced in large amounts using metal layer sheets and plastic layer sheets, which are cut to provide single pieces of the metal layer and the plastic layers to be laminated to provide a card body. In the present context a layer refers to the layer of the data carrier as such, wherein the skilled person will recognize that even larger layers can be provided as an intermediate step towards the production of the single card bodies.

The metal layer comprises a recess such that the metal layer looks like a frame providing the recess. Hence, the recess is surrounded by the parts of the metal layer. The recess can accordingly be named a window being introduced in the metal layer. The window or the recess is provided in a position where the final dual-interface module and the antenna is to be placed and positioned.

Furthermore, a carrier foil is provided holding an antenna. This can be performed by attaching the antenna to the carrier foil or the other way round to establish a foil and later on attach the antenna on the carrier foil. In the present context, only the final product is described such that the carrier foil and the antenna form one single unit, namely the interface module.

This interface module comprising the carrier foil and the antenna is created, which can likewise be performed in a separate step of the card production process. As the carrier foil along with the antenna is to be introduced into the recess, the dimensions of the recess must be chosen such that the carrier foil along with the antenna fits into such a recess. During production, it may likewise occur that the recess is larger than the carrier foil with the antenna. In this case additional filling material is required.

The carrier foil is attached to a plastic layer such that the carrier foil along with the antenna or even without the antenna is fixed to a plastic layer at a position where the recess of the metal layer is to be positioned. This results in an arrangement where the carrier foil along with the antenna or without the antenna can be form-closed with the recess of the metal layer. At least two examples of providing such a composite layer are possible. Firstly, the carrier foil is attached to a plastic layer holding the antenna or secondly the carrier foil is inserted into the recess in liquid form and cured later on such that the antenna can be provided on top of the carrier foil. In this second example the carrier foil alone is attached to a plastic layer, wherein in the first example the carrier foil along with the antenna is attached to the plastic layer. The result of such procedures is that finally the carrier foil holding the antenna is attached to a plastic layer.

The final product is the dual-interface data carrier comprising the metal layers in between at least two plastic layers and wherein the carrier foil along with the antenna is introduced into the recess of the metal layer. This can be explained as a so-called sandwiched arrangement, where the metal layer comprising the antenna module is inserted in between two plastic layers.

According to an aspect of the present invention, the at least two plastic layers comprise at least one transparent foil and/or at least one opaque foil or both foils are opaque. This provides the advantage that the plastic layers can be produced to provide further visual effects and especially for instance a plastic layer being transparent can be provided as top layer and a further opaque layer can be provided on the back side of the data carrier. The plastic layers may comprise further layers and especially above and below the metal layer several plastic layers can be arranged.

According to a further aspect of the present invention, the carrier foil has a thickness at least of the same thickness as the metal layer. This provides the advantage that a form-closed insertion of the carrier foil into the metal layer can be established. Hence, the metal layer is basically of the same thickness even when comprising the carrier foil and the antenna. In this way the composite layers can be handled as known in the art and no variations in thickness need to be handled.

According to a further aspect of the present invention, the carrier foil has a thickness greater than the thickness as the metal layer. This provides the advantage that the antenna layer is closer to the dual-interface module and the metal layer can stay in the middle of the card construction.

According to a further aspect of the present invention, the size of the carrier foil holding the antenna does not exceed the size of the recess. This provides the advantage that the carrier foil can be completely inserted into the recess and no further steps are required. The carrier foil accordingly holds basically the same dimensions as the recess. The carrier foil may likewise be smaller than the recess as demonstrated as follows.

According to a further aspect of the present invention, the size of the carrier foil holding the antenna is smaller than the size of the recess and the gap between the recess and the plastic layer carrying the antenna is filled with a filling material. This provides the advantage that even in case the carrier foil is smaller than the recess due to fabrication tolerances, a standard manufacturing procedure can be performed and the resulting gap in between the interface module and the recess can be filled to provide a stable arrangement.

According to a further aspect of the present invention, the layers are laminated to form the body of the data carrier. This provides the advantage that existing tools can be reused and the metal layer even when containing the carrier foil along with the antenna can be handled as known composite layers.

According to a further aspect of the present invention, the layers are adhered by means of an UV adhesive to form the body of the data carrier. This provides the advantage that no heat has to be implied and accordingly the structure of the data carrier is not harmed. An UV adhesive is a specific adhesive which is cured using ultraviolet rays.

According to a further aspect of the present invention, the antenna is attached to further components of the data carrier. This provides the advantage that the dual-interface can be provided using the antenna and further contact-based components are provided. To provide an overall dual-interface data carrier, known components may be involved to which the suggested interface module is attached.

According to a further aspect of the present invention, the data carrier carries further components for establishing a contact-based interface. This provides the advantage that components being able to interact with a card reader can likewise be introduced and, consequently, premanufactured contact-based components can be combined with structures according to the present invention.

According to a further aspect of the present invention, the antenna forms the contactless interface of the data carrier. This provides the advantage that the data carrier can be coupled with further devices. Hence, wireless communication is established and existing card readers can likewise be reused. Moreover, communication can be performed on both sides of the card.

According to a further aspect of the present invention, the carrier foil is attached to a plastic layer by means of an adhesive layer. This provides the advantage that either the plastic layer or the carrier foil may provide an adhesive layer which can be formed and arranged in between the carrier foil and the plastic layer such that a manufacturing step can be performed, which is easy to implement.

According to a further aspect of the present invention, the carrier foil is provided in cured liquid form. This provides the advantage that the recess can be filled with a material which later on forms the carrier foil. Once the liquid material is inserted into the recess, it can be cured and later on the antenna can be attached.

The object is also solved by a dual-interface module for insertion into a data carrier according to one of the above-mentioned aspects. The dual-interface module at least comprises the carrier foil along with the antenna in dimensions being insertable into the recess of the data carrier.

The object is also solved by a method for providing a portable dual-interface data carrier, comprising the steps of forming a metal layer comprising a recess at least of a size of a carrier foil holding an antenna, attaching the carrier foil holding the antenna to a plastic layer at a position of the recess and inserting the carrier foil holding the antenna into the recess, thereby forming at least a part of the body of the data carrier.

The person skilled in the art recognizes that the aforementioned method steps can be performed iteratively and/or in a different order. Furthermore, sub steps may be involved. For instance, the carrier foil holding the antenna can be inserted into the recess in one process step or such a process step may be separated such that the material forming the carrier foil is firstly introduced into the recess and secondly the antenna is provided on top of the carrier foil.

The object is also solved by a computer program product holding instructions for performing the suggested method.

It is of advantage that the suggested dual-interface data carrier comprises a data module holding structural features such as the carrier foil and the antenna in dimensions being insertable into the recess. Furthermore, the dual-interface data carrier can be manufactured using the suggested method and the other way round the suggested method steps are involved for forming structural features. Consequently, procedural aspects mentioned herein may imply structural features which are part of the suggested data carrier and furthermore structural or functional features of the suggested data carrier can be implemented using the suggested method.

BRIEF DESCRIPTION OF THE DRAWINGS

Further advantages of the present invention are explained in the context of the accompanying figures, which show:

FIG. 1: the overall structure of the portable dual-interface data carrier according to an aspect of the present invention;

FIG. 2: an intermediate product of the suggested dual-interface data carrier according to a further aspect of the present invention;

FIG. 3: the suggested dual-interface module to be inserted into the data carrier according to a further aspect of the present invention;

FIG. 4: the interface module being inserted into the recess thereby forming a gap according to an aspect of the present invention;

FIG. 5: the end product of the portable dual-interface data carrier according to a further aspect of the present invention;

DETAILED DESCRIPTION

Figure 6:
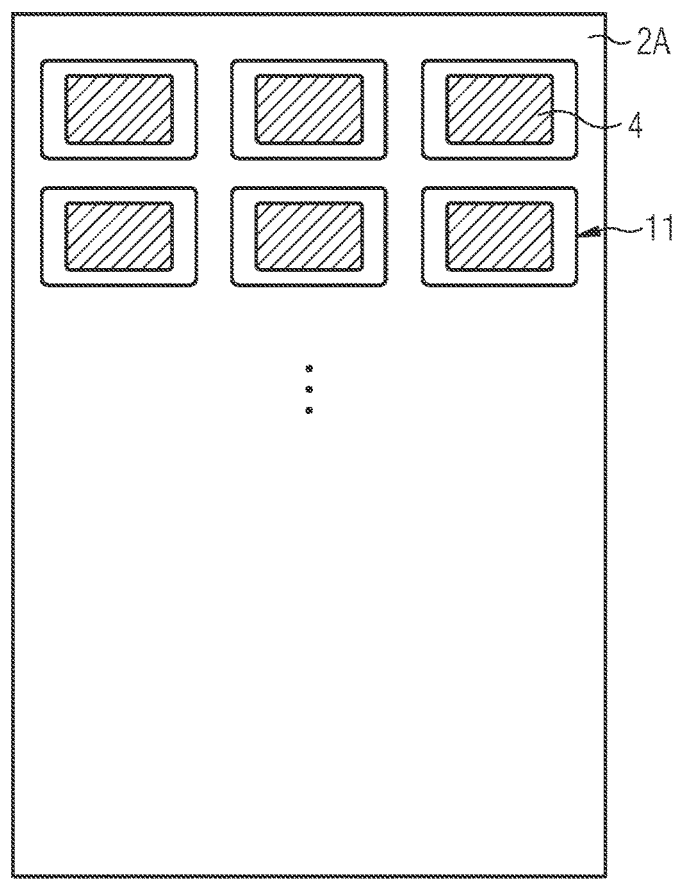
FIG. 6: a metal sheet being used when manufacturing a variety of portable dual-interface data carriers according to an aspect of the present invention.

FIG. 1 shows the general structure of the data carrier according to the present invention, where a first plastic layer 1 is provided on top and a second plastic layer 3 is provided on the back side of the card. In between both layers 1 and 3 a further layer, namely metal layer 2, is provided. As can be seen in FIG. 1, the overall structure is a so-called sandwiched structure, where the metal layer 2 is inserted in between the two plastic layers 1, 3.

The arrangement depicted by FIG. 1 may likewise comprise a PVC foil 1 and/or a PVC foil 3 which can be opaque with colored PVC. Likewise the PVC foil 1 and/or 3 can be coated with a thin metallic film to create a full face foil effect. The stack of FIG. 1 can be laminated or embedded by further layers of PVC, may they be opaque or transparent, to generate standard smart cards with a thickness according to ISO, ANSI, CQM requirements of about 760-840 μm.

The layer arrangements can likewise be sandwiched between PVC layers, which again can be transparent. Consequently, above layer 1 and below layer 3 an additional PVC layer can be arranged which potentially provides a protective coating.

As can be seen on the left and right side of FIG. 1 the metal layer 2 is visible from both sides such that when the card body is cut out of a respective sheet the metal edge can be seen from at least one side of the card body. Hence, the smart card comprises a metal layer being embedded such that the card body shows a metal edge at the side of the cards after cut from the finished laminated sheet. The metal edge on at least one side of the card is visible during usage and provides stability to the card edges and moreover establishes a design which communicates the high quality of the card as such.

Summarizing this issue the overall structure as depicted by FIG. 1 comprises metal edges on both sides which are visible to the user.

FIG. 2 shows the metal layer 2 with a recess 4 being provided in a frame-like structure. The metal layer 2 can be provided using large metal sheets and can be separated to form individual metal layers 2. The window structure of the recess as depicted in FIG. 2 is only one example, which is not limiting. However, such a window-like dimension is preferred.

FIG. 3 shows the interface module which is to be inserted into the metal layer 2. The interface module comprises a carrier foil 5 with the antenna 6. For connecting the antenna 6 with further components of the data carrier, connection units 7 are provided which may be used for bonding the antenna with further contact-based components.

The connection unit 7 may be used for a connection with interface modules as depicted by FIG. 5, for instance interface modules 10. The carrier foil shall have the thickness of the metal layer 2. The carrier foil 5 may be provided using larger sheets from which single carrier foils are extracted. Such a separation can be performed by punching, laser cutting or waterjet cutting. This might likewise hold true for further layers which are to be separated, such as the plastic layer.

FIG. 4 shows a gap 8 in between the recess 4 and the carrier foil 5. Such a gap can be filled using liquid filling material, which is cured later on. Furthermore, the cover foil 1 can be introduced using an adhesive. Finally, the composite layers can be joint together using temperature and pressure such as applied during laminating. Furthermore, UV adhesive can be used instead or additionally. In this way no heat is applied towards the single layers in case no lamination is accomplished.

The dual-interface module 10 is then introduced into the card 9, which may be provided as the suggested data carrier. This arrangement is depicted by FIG. 5.

In general, the recess 4 of the metal layer 2 can be arranged such that the antenna 5 is provided as one component comprising the carrier foil 5 and the antenna 6. In this way a composite antenna foil 5 is established. Likewise, the recess 4 can be filled with material resulting in the foil which carries the antenna. Such a liquid material may be liquid PVC and upon curing the antenna 6 including bonds 7 can be applied. Furthermore, a plastic cover layer 1 can be attached to the composite structure.

Advantages of the present invention comprise that contactless data transmission functionality of the card can be provided on both sides of the card and furthermore, no expensive ferrite is used.

FIG. 6 shows a metal sheet 2A which is used to provide the metal layer 2. The metal sheet 2A may comprise recesses 4, which are punched, and in a further step the metal layer 4 is punched out of the metal sheet 2A. In this way large amounts of metal layers can be produced. A similar procedure can be applied for providing the plastic layers. The layers to be punched out are demonstrated by reference sign 11.

Figure 7:
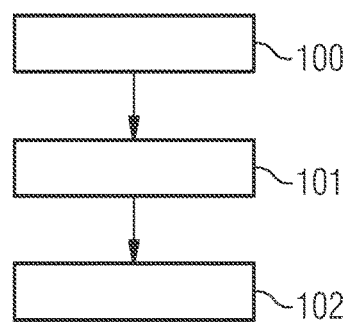
FIG. 7: a schematic flowchart depicting the method for providing a portable dual-interface data carrier according to an aspect of the present invention.

FIG. 7 shows a flowchart of the method for providing the portable dual-interface data carrier comprising the steps of forming 100 a metal layer 2 comprising a recess 4 at least the size of a carrier foil 5 holding an antenna 6, attaching 101 the carrier foil 5 holding the antenna 6 to a plastic layer 1, 3 at a position of the recess 4 and inserting 102 the carrier foil 5 holding the antenna 6 into the recess 4 thereby forming at least a part of the body of the data carrier.

As indicated above, the suggested method may comprise further substeps and especially steps may be performed iteratively and/or in a different order.

The invention claimed is:

1. A method for providing a portable dual-interface data carrier, the method comprising the steps of:
    forming a metal layer comprising a recess at least of a size of a carrier foil holding an antenna;
    attaching the carrier foil holding the antenna to a first plastic layer at a position of the recess;
    inserting the carrier foil holding the antenna into the recess; and
    forming at least a part of a body of the data carrier by forming a second plastic layer such that the metal layer is arranged between the first plastic layer and the second plastic layer.

2. A computer program product being arranged to perform a method in accordance with claim 1, when being executed on a computer.

3. A method for providing a portable dual-interface data carrier, the method comprising:
    providing a metal layer comprising a recess at least of a size of a carrier foil holding an antenna;
    introducing the carrier foil into the recess of the metal layer;
    attaching a first plastic layer to a first side of the metal layer;
    forming at least a part of a body of the data carrier by attaching a second plastic layer to a second side of the metal layer, the second side of the metal layer being opposite from the first side of the metal layer, such that the metal layer is arranged between the first plastic layer and the second plastic layer.

4. The method according to claim 3, wherein introducing the carrier foil into the recess includes attaching the carrier foil to the first plastic layer at a position where the recess of the metal layer is to be positioned.

5. The method according to claim 4, wherein the carrier foil is attached to the first plastic layer such that the carrier foil and the antenna are fixed to the first plastic layer.

6. The method according to claim 4, wherein the carrier foil is first attached to the first plastic layer such that the carrier foil is fixed to the plastic layer without the antenna.

7. The method according to claim 3, wherein introducing the carrier foil into the recess includes inserting the carrier foil into the recess in liquid form.

8. The method according to claim 7, wherein the antenna is provided on top of the carrier foil.

9. The method according to claim 7, wherein introducing the carrier foil into the recess includes inserting the carrier foil and subsequently attaching the carrier foil to the first plastic layer.

10. The method according to claim 7, further comprising curing the carrier foil.

11. The method according to claim 3, wherein the metal layer comprises a first metal layer and a second metal layer.

12. The method according to claim 3, wherein the first plastic layer and/or the second plastic layer includes at least one transparent foil.

13. The method according to claim 3, wherein the first plastic layer and/or the second plastic layer includes at least one opaque foil.

14. The method according to claim 3, wherein the first plastic layer and/or the second plastic layer includes several plastic layers.

15. The method according to claim 3, wherein the carrier foil has a thickness at least as thick or greater than a thickness of the metal layer.

16. The method according to claim 3, wherein the size of the carrier foil holding the antenna is smaller than the size of the recess such that a gap is provided, and
    wherein said method further comprises filling said gap with a filling material.

17. The method according to claim 3, wherein the data carrier is provided such that the data carrier does not include ferrite material.

18. A method of making a portable dual-interface data carrier, the method comprising:
    providing a metal layer comprising a recess at least of a size of a carrier foil holding an antenna;
    introducing the carrier foil and the antenna into the recess of the metal layer;
    forming at least a part of a body of the data carrier by arranging the metal layer between a first plastic layer and a second plastic layer, each of the first plastic layer and the second plastic layer being attached to the metal layer.

19. The method according to claim 18, wherein introducing the carrier foil into the recess includes attaching the carrier foil to the first plastic layer at a position where the recess of the metal layer is to be positioned.

20. The method according to claim 18, wherein introducing the carrier foil into the recess includes inserting the carrier foil into the recess.

\* \* \* \* \*